April 26, 1938.   J. T. LEONARD   2,115,637

FLUID DISTRIBUTING DEVICE

Filed April 27, 1932

INVENTOR:
JOHN T. LEONARD
ATTORNEYS

Patented Apr. 26, 1938

2,115,637

UNITED STATES PATENT OFFICE 2,115,637

FLUID DISTRIBUTING DEVICE

John T. Leonard, East Cleveland, Ohio

Application April 27, 1932, Serial No. 607,708

3 Claims. (Cl. 184—7)

This invention relates generally to fluid distributing apparatus, and as its principal object aims to provide an improved and simplified distributor for use in lubricating systems of the progressive type.

Another object of this invention is to provide an improved form of lubricant distributor of the positive displacement type, wherein the fluid displacing means and the fluid control valve means operate in the same cylinder.

Another object of this invention is to provide an improved lubricant distributor of the type referred to, having a cylinder embodying a plurality of fluid passages and a fluid-flow control device shiftable in said cylinder by fluid pressure for controlling said passages.

It is a further object of this invention to provide an improved lubricant distributor of the type referred to, wherein the fluid-flow control means includes a pair of spaced valve elements movable longitudinally in the cylinder, and a plunger reciprocable in the section of the cylinder included between the spaced valve elements.

Still another object of this invention is to provide an improved lubricant distributor of the type referred to, wherein the fluid passages include a passage at each end of the cylinder, and wherein the fluid-flow control means includes a pair of spaced valve elements movable conjointly in the cylinder and having a passage extending through the same for registration with the passages at the ends of the cylinder, and a plunger reciprocable in the section of the cylinder included between the spaced valve elements.

The invention may be further briefly summarized as consisting in certain novel combinations and arrangements of parts, hereinafter described, and particularly set out in the appended claims.

In the accompanying sheet of drawing.

Figure 1:
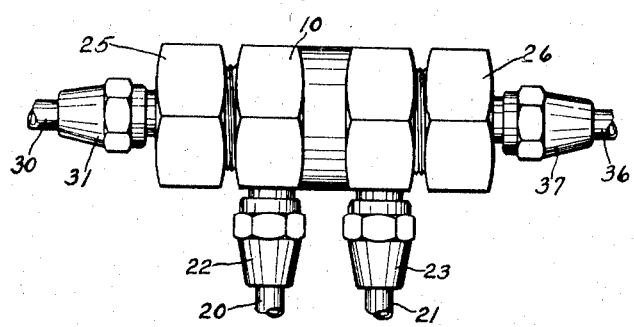
Fig. 1 is a side elevational view of a fluid distributing device embodying my invention.
Figure 2:
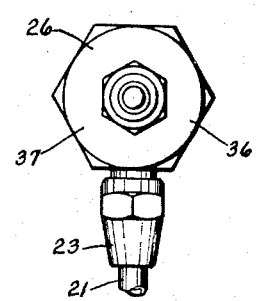
Fig 2 is an end view thereof.

Detailed reference will now be made to the accompanying drawing, wherein I have illustrated a fluid distributing device of improved and simplified form. It will be apparent from the drawing and the following detailed description that my distributing device may be used in various fluid systems and with various different fluids, but the device is especially suitable for use in lubricating systems of the progressive type, wherein a predetermined quantity of lubricant must be dispensed at each lubricating station before the stream of lubricant can pass on to the next succeeding lubricating station. Although I have illustrated what I now regard to be the preferred form of my fluid distributing device, it should be understood that my invention may be embodied in various other structural arrangements.

As shown in the drawing, my fluid distributing device is provided with an elongated body 10, having a working chamber or cylinder 11 therein. This elongated body may be constructed of any suitable material, but is preferably formed of cast metal and is provided at its ends with threaded connecting portions 12 and 13. Intermediate its ends the cylinder is provided with longitudinally spaced bosses or nipples 14 and 15, having discharge passages 16 and 17, extending therethrough and communicating, respectively, with the cylinder 11 through ports 18 and 19 formed in the inner surface of the cylinder wall. The nipples 14 and 15 are preferably threaded to permit the pipes or conduits 20 and 21 to be connected thereto by means of the nuts or couplings 22 and 23.

The cylinder is closed at its ends by means of cover members 25 and 26, which cooperate, respectively, with the threaded connecting portions 12 and 13. The cover member 25 is provided with a threaded boss or nipple 27 having a passage 28 extending therethrough and communicating with the cylinder through a port 29. A conduit 30 may be connected to the cover member 25, as by means of a coupling 31 engaging the threaded nipple 27. The cover member 26 is also provided with a threaded nipple 33, having a passage 34 extending therethrough and communicating with the cylinder through a port 35. A conduit 36 may be connected to the cover member 26 by means of a nut or coupling 37 engaging the threaded nipple 33.

Figure 3:
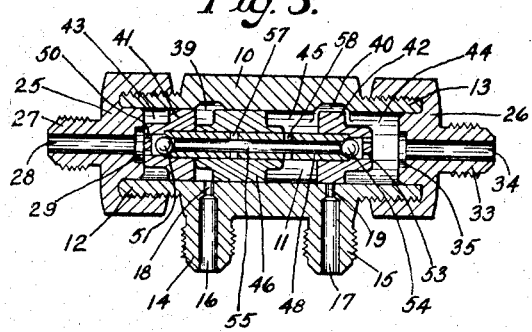
Figs. 3, 4 and 5 are sectional views taken longitudinally through the device showing the fluid-flow control means in different positions.
Figure 6:
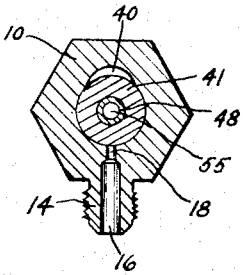
Fig. 6 is a transverse sectional view taken on line 6—6 of Fig. 4.
Figure 7:
Fig. 7 is a side elevation showing one of the valve elements in detached relation.
Figure 8:
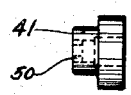
Fig. 8 is an end view thereof.
Figure 9:
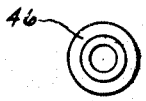
Fig. 9 is an end view of the plunger in detached relation.
Figure 10:
Fig. 10 is a side elevational view thereof.

The cylinder is also provided intermediate its ends with a pair of longitudinally spaced ports 39 and 40, which are preferably formed as recesses in the inner surface of the cylinder wall, as shown in Figs. 3 and 6 of the drawing. These ports are located in the axial direction of the cylinder to correspond with the spaced ports 18 and 19, or, in other words, the port 39 is located in substantially the same transverse plane as the port 18, and the port 40 is located in substantially the same transverse plane as the port 19. For a purpose hereinafter to be explained, the ports 39 and 40 are so formed that they extend in the axial direction of the cylinder for a greater distance than do the ports 18 and 19.

Figure 4:
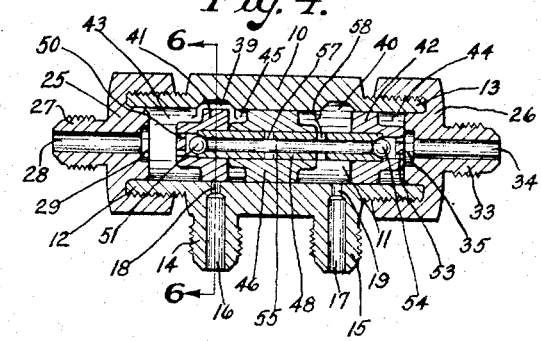

For controlling the passage of fluid through the distributor I provide a fluid-flow control device which is shiftable longitudinally within the cylinder by fluid pressure admitted either through the passage 28 or through the passage 34. As shown in the drawing, this fluid-flow control device comprises a pair of spaced valve elements 41 and 42, which divide the cylinder into end chambers or sections 43 and 44 and an intermediate chamber or section 45, and another valve element or plunger 46 which is reciprocably mounted in the section of the cylinder included between the spaced valve elements. The valve elements 41 and 42 are constructed in the form of pistons, as shown in Figs. 3 and 6, and are connected for conjoint reciprocable movement in the cylinder by a tubular connecting member or valve stem 48 which extends through the plunger 46. The valve elements may be attached to the connecting member in any suitable manner, but I prefer to provide these valve elements with recesses into which the ends of the connecting member extend. The valve member 41 is provided with one or more passages 50, which communicate with the recess of this valve member and are located to register with the port 29 when the valve member engages the inner wall of the cover member 25, as shown in Fig. 3. A check valve element 51, preferably in the form of a ball, is retained in the recess of the valve element 41 and cooperates with a valve seat formed on the adjacent end of the connecting member 48. The valve element 42 is provided with one or more passages 53 which communicate with the recess in this valve element and are located to register with the port 35 when the valve element is in engagement with the inner surface of the cover member 26, as shown in Fig. 4. A check valve element 54, in the form of a ball, is confined in the recess of the valve element and cooperates with a valve seat formed on the adjacent end of the connecting member 48.

Figure 5:
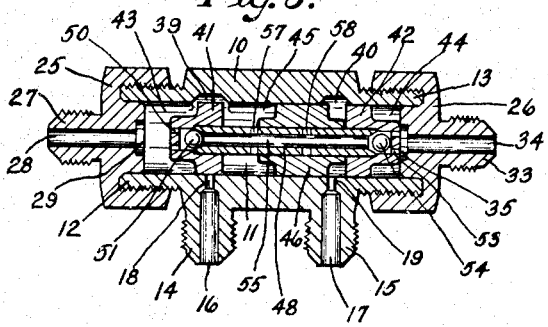

The connecting member is provided with a passage 55, which extends longitudinally therethrough, and which is controlled at its ends by the check valve elements 51 and 54. This connecting member is also provided with longitudinally spaced ports 57 and 58 for admitting fluid to the passage 55 from the intermediate cylinder section 45. These ports are so located that the port 58 will be uncovered, and the port 57 will be covered, when the plunger 46 is in engagement with the valve element 41, as shown in Figs. 3 and 4, and the port 57 will be uncovered, and the port 58 will be covered, when the plunger 46 is in engagement with the valve element 42, as shown in Fig. 5. The passage 55 thus provides a controlled by-pass for by-passing pressure fluid directly through the device after a predetermined quantity of fluid has been discharged through the port 18 or the port 19, as the case may be, depending upon the direction of movement of the fluid.

In the operation of the device fluid under pressure, such as a lubricant to be distributed, is forced into the cylinder 11, through the conduit 30 and the passage 28. As this pressure fluid enters the end section 43 of the cylinder, the check valve element 51 is pressed against its seat, and the action of the fluid against the valve element 41 causes the fluid-flow control device to be shifted as a unit to the right, as seen in Fig. 3, until such movement is arrested by engagement of the valve element 42 with the cover member 26, as shown in Fig. 4. When the control device has been shifted to this position, it will be noted that the valve element 41 has closed the port 18 and stands opposite the port 39. The latter port being formed to extend axially of the cylinder a greater distance than the axial thickness of the valve element 41, the pressure fluid will be by-passed around this valve element through the port 39 and admitted to the cylinder section 45 which is included between the spaced valve elements. The action of the pressure fluid against the left end of the plunger 46 causes the latter to be shifted to the right, or, in other words, toward the valve element 42, thereby forcing a predetermined volume of fluid out through the port 19 and the passage 17 for delivery, through the conduit 21, to a bearing or other part to be lubricated.

The movement of the plunger 46 continues in the same direction until it engages the valve element 42, at which time the desired predetermined volume of fluid will have been discharged through the passage 17, and the port 57 in the connecting member 48 will have been uncovered by the plunger. The opening of the port 57 admits pressure fluid to the longitudinal passage 55 of the connecting member, which fluid shifts the check valve element 54 to the open position, as shown in Fig. 5, and flows outwardly through the registering ports 53 and 35 into the passage 34. From the passage 34 the pressure fluid is conducted to any other desired point, such as the next succeeding lubricating station, through the conduit 36.

When it is desired to discharge lubricant through the passage 16, for delivery by the conduit 20 to a bearing or other point, fluid pressure is supplied to the device through the passage 34. The admission of pressure fluid to the end section 44 of the cylinder, causes the fluid-flow control device to be actuated in the manner just described, but with the parts thereof moving in the opposite direction, or in other words, toward the left, as seen in Figs. 3, 4 and 5. This movement of the valve elements and plunger, causes a predetermined volume of fluid to be forced out through the port 18 and the passage 16 by the plunger 46. Upon the completion of this discharge stroke of the plunger, the port 58 is uncovered and pressure fluid is discharged through the connecting member 48 and the passage 28 for delivery to the next succeeding lubricating station through the conduit 30.

From the arrangement and operation just described, it will be seen that when a predetermined volume of lubricant or other fluid is to be discharged or dispensed through the passage 17, the fluid to be dispensed is forced into the cylinder through the passage 28, and after the plunger has been shifted to discharge the predetermined volume of fluid through the passage 17, the entire stream of pressure fluid is allowed to pass freely through the device for operating the next distributor. When fluid is to be dispensed through the passage 16 the fluid is forced into the distributor through the passage 34, and after a predetermined quantity of the fluid has been forced out through the passage 16 by the plunger, the stream of pressure fluid may then flow freely through the device for operating the distributor at the next station.

Figure 11:
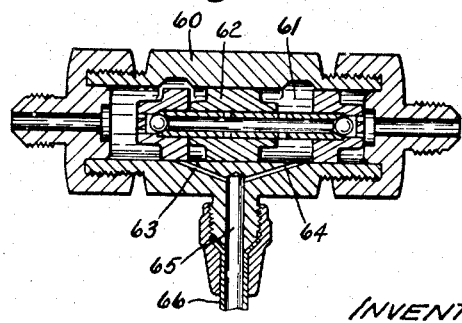
Fig. 11 is a longitudinal sectional view taken through another fluid distributing device embodying my invention.

In Fig. 11 of the drawing I have shown another distributing device which embodies my invention and which differs from the device just described only as to the arrangement of the discharge passages. In the device of Fig. 11, I have shown the distributor as comprising a body or casing 60, having a cylinder 61 therein, and a fluid-flow control device 62 shiftable longitudinally within the cylinder. In this arrangement the casing 60 is provided with discharge ports 63 and 64 which are spaced longitudinally of the cylinder. These discharge ports are connected by a passage 65 from which lubricant may be delivered to any desired point through the conduit 66. It will be seen that with this arrangement a predetermined quantity of lubricant will be delivered into the passage 65 by each stroke of the plunger of the fluid-flow control device 62.

It will now be readily seen that I have provided an improved form of fluid distributing device, which is of simple form and which is so designed that the various parts thereof can be economically manufactured and assembled. Moreover, it will be seen that because of its simplicity of construction, the device will be very efficient and reliable in operation, since there are few parts to become worn or to get out of order. It will also be seen that because of the positive and reliable action obtained from the arrangement of ports and valve members which I have provided, my fluid distributing device is well suited for use in lubricating systems of the progressive type and in various other fluid distributing systems.

While I have illustrated and described the device of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention what I claim is:

1. In a device of the character described the combination of a cylinder having pressure fluid connections thereto and also having a pair of spaced entry ports located intermediate its ends and a pair of spaced discharge ports located in substantially the same transverse plane as said entry ports, a fluid control member movable longitudinally in said cylinder and having spaced valve elements controlling said ports, the spacing of said valve elements being such that they are adapted to include therebetween a section of said cylinder and a combination of said ports which consists of at least one of said entry ports and at least one of said discharge ports, said valve elements and ports being so proportioned and arranged that when one valve element is in position to close a discharge port the corresponding entry port admits pressure fluid to the included cylinder section and the other discharge port is in communication with the included cylinder section, a tubular valve stem connecting said valve elements and having spaced ports intermediate the valve elements, a piston slidable on said valve stem for alternately discharging fluid through the discharge ports and for alternately opening the ports of the valve stem, each of said valve elements having a recess therein into which an end of said valve stem extends, and a check ball in the recess of each valve element for cooperation with an end of said valve stem to control the flow of fluid through the latter.

2. A lubricating valve arranged to divert a predetermined amount of lubricant out of a stream flowing through it and to discharge it when the stream reverses including a valve casing provided with a pair of intake connections and a discharge connection, a single piston bore in said casing, a plurality of pistons therein, means for storing a predetermined amount of lubricant in said bore between two of said pistons when lubricant pressure is applied at one of said intake connections and means for discharging said stored lubricant through said discharge connection when the fluid pressure is applied at the other of said intake connections.

3. A lubricating valve arranged to divert a predetermined amount of lubricant out of the stream flowing through it and to discharge said lubricant when the lubricant stream is reversed comprising a valve casing provided with intake connections at each end and a discharge connection, a plurality of pistons including a pair of valve pistons, and a discharge piston, a piston shaft slidably mounted in said discharge piston for maintaining a predetermined distance between said valve pistons, valve ports regulated by said pistons for guiding the lubricant stream through said valve and for simultaneously storing a predetermined amount of lubricant in said casing and regulated by said pistons upon reversal of said stream to discharge said stored lubricant through said discharge opening and for simultaneously storing an equal amount in said casing.

JOHN T. LEONARD.